(12) United States Patent
Giordano, III et al.

(10) Patent No.: US 6,370,141 B1
(45) Date of Patent: Apr. 9, 2002

(54) METHOD AND APPARATUS FOR CONFIGURING AN INTERNET APPLIANCE

(75) Inventors: Joseph Giordano, III, Redwood City, CA (US); Jacob Samboursky, Herzelia (IL)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/069,716

(22) Filed: Apr. 29, 1998

(51) Int. Cl.⁷ .......................... H04L 12/54; H04M 3/42
(52) U.S. Cl. ............... 370/386; 370/429; 379/201.05; 709/219; 709/221
(58) Field of Search .................. 709/218, 219, 709/201, 245, 203, 223, 220, 221, 217; 379/201, 27, 201.05; 370/352, 354, 355, 356, 400, 401, 386, 429; 345/335; 707/104, 101, 10, 513; 364/514 A; 713/200; 701/201

(56) References Cited

U.S. PATENT DOCUMENTS

| | | | |
|---|---|---|---|
| 4,750,136 A | 6/1988 | Arpin et al. ............... 710/10 |
| 4,763,191 A | 8/1988 | Gordon et al. ............ 725/104 |
| 5,250,940 A | 10/1993 | Valentaten et al. ......... 345/189 |
| 5,287,103 A | 2/1994 | Kasprzyk et al. ...... 340/825.52 |
| 5,319,644 A | 6/1994 | Liang ........................ 370/452 |
| 5,361,250 A | 11/1994 | Nguyen et al. ............ 370/222 |
| 5,367,635 A | 11/1994 | Bauer et al. ............... 704/221 |
| 5,423,002 A | 6/1995 | Hart .......................... 704/249 |
| 5,513,126 A | * 4/1996 | Harkins et al. ......... 364/514 A |
| 5,572,572 A | 11/1996 | Kawan et al. ............ 379/90.01 |
| 5,572,643 A | 11/1996 | Judson ...................... 395/793 |
| 5,633,920 A | 5/1997 | Kikinis et al. ............. 379/130 |

(List continued on next page.)

FOREIGN PATENT DOCUMENTS

| | | | |
|---|---|---|---|
| WO | WO 97/16938 | 5/1997 | ............ H04Q/7/32 |
| WO | WO 97/38511 | 10/1997 | ........... H04L/12/64 |
| WO | WO 98/11704 | 3/1998 | |
| WO | WO 98/16051 | 4/1998 | ............ H04M/3/00 |

OTHER PUBLICATIONS

Puntikov et al., "AVCS: The APL Version Control System", 1995, pp 154–161.

Stein, Lincoln D. "Creating a Self-Referencing URL That Preserves State Information", printed from http://hensa.ac.uk/ftp/mirrors/perl-. . . GI/Creating a Self Referencing URL html on Feb. 16, 1999.

(List continued on next page.)

Primary Examiner—Hassan Kizou
Assistant Examiner—John Pezzlo
(74) Attorney, Agent, or Firm—Thelen Reid & Priest LLP; David B. Ritchie

(57) ABSTRACT

The Internet appliance accesses an HTML page on a Web site containing configuration information for an Internet appliance, such as an Internet compatible telephone. Data from the HTML page are downloaded to the Internet appliance to modify its options or settings automatically upon accessing the HTML page, or as directed by the user. The data may be downloaded to a programmable memory in the Internet appliance and the stored data may be used to upgrade the Internet appliance. The upgrade HTML page may include information to alert the user when the new information is available regarding changes to options and settings of the Internet appliance. Alternatively, data from the Internet appliance are placed in an HTML page and the data are then uploaded to the Web site. Additional embodiments provide other functions that may be placed in an HTML page to effect some internal action in the Internet appliance, such as checking e-mail.

7 Claims, 3 Drawing Sheets

U.S. PATENT DOCUMENTS

| | | | | |
|---|---|---|---|---|
| 5,657,378 | A | | 8/1997 | Haddock et al. ......... 379/93.23 |
| 5,687,398 | A | | 11/1997 | Martineau ..................... 712/36 |
| 5,761,662 | A | * | 6/1998 | Dasan ......................... 707/10 |
| 5,809,287 | A | | 9/1998 | Stupek, Jr. et al. ........... 703/22 |
| 5,812,776 | A | | 9/1998 | Gifford ....................... 709/217 |
| 5,826,253 | A | | 10/1998 | Bredenberg ..................... 707/2 |
| 5,832,522 | A | | 11/1998 | Blickenstaff et al. ....... 707/204 |
| 5,835,720 | A | | 11/1998 | Nelson et al. .............. 709/224 |
| 5,835,727 | A | | 11/1998 | Wong et al. ................ 709/238 |
| 5,835,911 | A | | 11/1998 | Nakagawa et al. ......... 707/203 |
| 5,838,683 | A | | 11/1998 | Corley et al. ............... 370/408 |
| 5,873,103 | A | | 2/1999 | Trede et al. ................ 707/204 |
| 5,887,139 | A | | 3/1999 | Madison, Jr. et al. ....... 709/223 |
| 5,895,461 | A | | 4/1999 | De La Huerga et al. ........ 707/1 |
| 5,913,037 | A | | 6/1999 | Spofford et al. ............ 709/226 |
| 5,918,016 | A | | 6/1999 | Brewer et al. .............. 709/220 |
| 5,922,047 | A | * | 7/1999 | Newlin et al. .............. 709/217 |
| 5,956,732 | A | | 9/1999 | Tsuchida .................... 707/203 |
| 5,961,586 | A | * | 10/1999 | Pedersen .................... 709/201 |
| 5,974,454 | A | | 10/1999 | Apfel et al. ................ 709/221 |
| 5,995,756 | A | * | 11/1999 | Herrmann .................... 717/11 |
| 5,999,740 | A | | 12/1999 | Rowley ....................... 717/11 |
| 6,005,568 | A | * | 12/1999 | Simonoff et al. ........... 345/335 |
| 6,012,088 | A | * | 1/2000 | Li et al. ..................... 709/219 |
| 6,026,438 | A | * | 2/2000 | Piazza et al. ............... 709/221 |
| 6,031,904 | A | * | 2/2000 | An et al. .................... 379/201 |
| 6,041,360 | A | * | 3/2000 | Himmel et al. ............. 709/245 |
| 6,061,686 | A | * | 5/2000 | Gauvin et al. ................ 707/10 |
| 6,074,434 | A | | 6/2000 | Cole et al. ..................... 717/11 |
| 6,122,657 | A | | 9/2000 | Hoffman, Jr. et al. ...... 709/201 |
| 6,141,666 | A | * | 10/2000 | Tobin ......................... 707/513 |
| 6,195,681 | B1 | * | 2/2001 | Appleman et al. .......... 709/203 |
| 6,195,694 | B1 | * | 2/2001 | Chen et al. ................. 709/220 |

OTHER PUBLICATIONS

Fugino, Nobutsugu, et al., "Mobile Information Service Based on Multi–Agent Architecture", IEICE Trans. Commun., vol. ESO–B, No. 10, Oct. 1997.

"Internet Telephones", PC Magazine, Oct. 8, 1996, pp. 107–108, 110, 114, 117–120.

Lilley, Vic, "The Internet Phone", Management Accounting, Dec. 1996, vol. 74, Issue 11, pp. 36–37.

Low, Colin, "The Internet Telephone Red Herring", Hewlett–Packard, May 15, 1996.

Fujino, Kimoto, and Hda; Mobile Information Service Based on Multi–Agent Architecture, Oct. 7, 1997, Ieice Trans. Commun., vol.ESO–B.

Berners–Lee et al., "Uniform Resource Locators (URL)", Dec. 1994.

* cited by examiner

METHOD AND APPARATUS FOR CONFIGURING AN INTERNET APPLIANCE

BACKGROUND OF THE INVENTION

1. Technical Field

This invention relates to electronic communication systems. More particularly, the invention relates to a system for upgrading and configuring an Internet appliance (also referred to herein as a "network appliance") from databases distributed over an electronic network.

2. Description of the Prior Art

Electronic telecommunications networks are increasingly used to store and distribute a variety of data. Examples of such electronic networks include the Internet, and intranet systems. For example, World Wide Web (Web) pages (which may be accessed over the Internet) may include text, graphical displays, video displays, animation, and sounds.

The Web is usually accessed via telephone lines by a modem-connected computer. However, the Web may also be accessed through other devices, including personal data assistants, fax machines, and Internet-compatible telephones. One telephone that provides Web access is described in M. Valentaten, B. Moeschen, Y. Friedman, Y.-T. Sidi, Z. Bilkowsky, Z. Peleg , *Multi-Mode Home Terminal System that Utilizes a Single Embedded General Purpose/ DSP Processor and a Single Random Access Memory*, U.S. Pat. No. 5,250,940 (Oct. 5, 1993).

A Web page is encoded in Hypertext Markup Language (html). An HTML document is a plain-text (ASCII) file that uses tags to denote the various elements in the document. An element may include an attribute, which is additional information that is included between tags.

HTML can be used to link text and/or images, such as icons, to another document or section of a document. The user activates a link by clicking on it, and the linked database is directly accessed. Links are used to access related information, or to contact a person or entity. However, information on a Web page must have the requisite HTML tags to provide an active link.

It is known to download modifications to computer software from the Web. The user selects a hypertext link on a Web page and the appropriate data is downloaded to the user's computer. The user then uses the downloaded data to upgrade the computer. However, such downloads are typically either software applications or graphical representations, such as icons.

A Web page may also provide other useful information. For example, various settings, such as an Internet Service Provider's (ISP) access telephone number may be stored on a Web page. However, the user must still manually configure the computer to change this information locally. In addition to the options and settings necessary to connect to the Web, such Internet appliances as an Internet-compatible telephone also require settings for telephone functions. Such telephone functions include service features, such as Caller ID or Call Waiting, as well as the graphical user interface for displaying the telephone functions, and user profile configuration information, such as how to dial, local area code, and the user's name, address, and zip code.

An Internet appliance, such as the Internet-compatible telephone, typically has limited processing power and memory storage, as compared to a computer. Thus, it is advantageous to minimize the power and memory required to modify the configurations and features of the appliance.

It would therefore be an advantageous to provide a method and system for automatically configuring an Internet-compatible telephone from the Internet. It would also be advantageous if such method and system minimized the processing power and memory storage required for such an upgrade.

SUMMARY OF THE INVENTION

The present invention provides a method and system for automatically configuring an Internet appliance from a Web page, i.e. via an HTML page. The invention is capable of modifying variables that include, options, settings, and supported features, as well as the graphical user interface for the Internet appliance. Such variables may consist include, for example, Internet Service Provider (ISP) telephone numbers, user's area code, name, address, and zip code and such calling features as call waiting, call forwarding, and last call returned. Uniquely, the features provided by the invention are implemented by a novel put/get mechanism.

The preferred embodiment of the invention is adapted for use with the Internet appliance described above (see U.S. Pat. No. 5,250,940.) However, alternative embodiments of the invention are adapted for use with any Internet access device. In the preferred embodiment, the Internet appliance accesses a special HTML page on a Web site containing configuration information for the appliance. This HTML page is used to modify the Internet appliance.

In one embodiment of the invention, data from the HTML page are downloaded to the Internet appliance to modify its options or settings automatically upon accessing the page. However, in the preferred embodiment of the invention, the HTML page includes special tags that direct the Internet appliance to perform certain operations. The user then selects the desired options and settings and the Internet appliance is adjusted accordingly in accordance with the definitions contained in the HTML page.

In an alternative, equally preferred embodiment, the upgrade data are downloaded from the HTML page to programmable memory in the Internet appliance. The stored data are then used to upgrade the Internet appliance.

HTML pages containing configuration data for the Internet appliance may be stored on a server, or on any computer accessible via the Internet. For example, the server may maintain a cache of Web pages frequently accessed by the Internet appliance, such as HTML pages containing configuration data.

In one embodiment of the invention, an upgrade Web page alerts the user when new information regarding changes to options and settings of the Internet appliance is available. Equipment or service companies, such as a telephone company, can provide HTML pages on their Web sites to make upgrades available to their users. A user then selects new features, such as Call Forwarding, or upgrades existing services directly from the telephone company.

In a preferred embodiment of the invention, telephone service information is automated. In this embodiment, a selectable area is provided on a graphical user interface of the Internet appliance. When this area is selected, the Web page for the desired service is automatically accessed, and the data are downloaded.

A profile of the Internet-compatible telephone user may be stored in the Internet appliance. The HTML page uses this profile to provide customized services. For example, the user's profile information can be retrieved from the Internet appliance and sent to a Web site to provide personalized or localized services.

DETAILED DESCRIPTION OF THE INVENTION

The present invention provides a method and system for automatically configuring and/or querying an Internet appliance from a Web page. The invention is a user-friendly and efficient method and system for configuring the options and settings of an Internet appliance, such as an Internet-compatible telephone. Additionally, the invention is also operable to modify the features supported by the Internet appliance, as well as the graphical user interface for the appliance display. The preferred embodiment of the invention is adapted for use with an Internet appliance (see U.S. Pat. No. 5,250,940.) However, alternative embodiments of the invention are adapted for use with any Internet access device.

The Web is usually accessed via telephone lines by a modem-connected computer, or Internet access appliance. The client dials up an Internet Service Provider (ISP), for example using the Point-to-Point protocol (PPP). In turn, the ISP host establishes the connection to the Internet.

Figure 1:
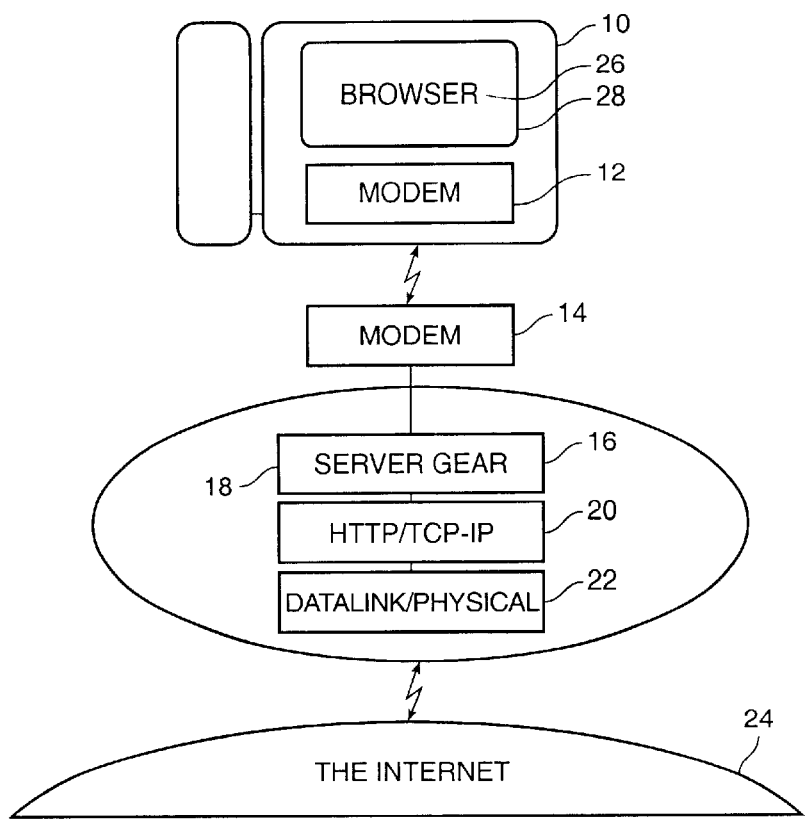
FIG. 1 is a diagram of an Internet-compatible telephone connection to the Internet in accordance with a preferred embodiment of the invention.

FIG. 1 is a diagram of an Internet-compatible telephone showing a connection to the Internet according to the invention. The internet-compatible telephone 10 (client) uses a modem 12 to dial-up a modem 14 at the ISP's local point-of-presence (POP). This modem 12 transmits information from the client to a server 16 residing on the ISP's local area network (LAN) 18. The server uses Hypertext Transport Protocol (HTTP) and TCP/IP (Transmission Control Protocol/Internet Protocol) protocol 20 to communicate, via a datalink 22 to the Internet 24. The Internet-compatible telephone displays the information retrieved from the Internet on its display screen 26 using a browser application 28.

Figure 2:
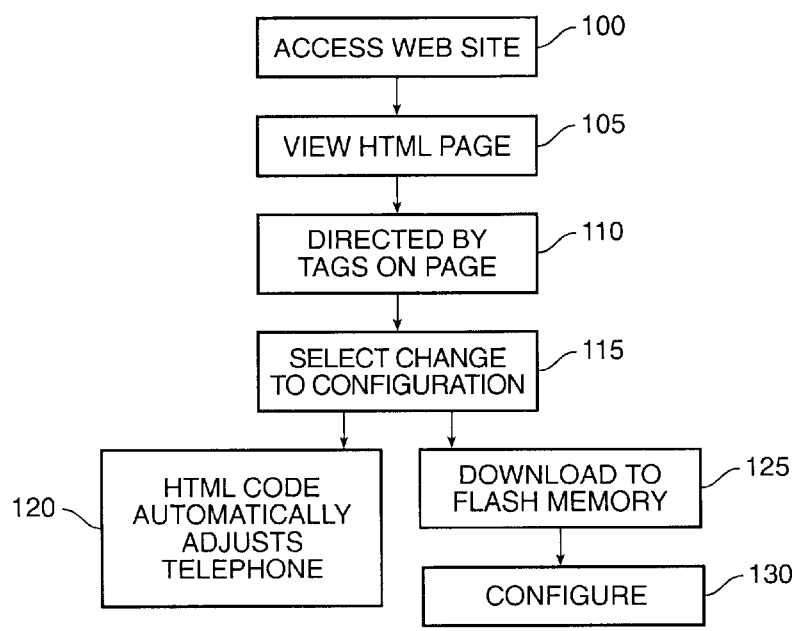
FIG. 2 is a flowchart of a method for configuring an Internet appliance in accordance with present invention.

FIG. 2 is a flowchart of a method for configuring an Internet appliance in accordance with to the invention. For example, an Internet-compatible telephone has many settings within it that control functions of the telephone. Such settings include the telephone numbers for dialing in to the ISP network, user names, profile information, local default pages, as well as settings for handling connecting and disconnecting, time outs, and special calling features related to the telephone portion of the appliance, such as call waiting and call forwarding.

To reconfigure these options and settings, the Internet-compatible telephone is connected to a Web site (100) containing configuration information for the telephone. The Internet-compatible telephone then accesses an HTML page (105) on that Web site. This HTML page is used to configure the Internet-compatible telephone.

In one embodiment of the invention, data from the HTML page are downloaded to the Internet-compatible telephone to reconfigure its options or settings automatically. However, in the preferred embodiment of the invention, the HTML page includes special tags that direct (110) the Internet-compatible telephone to perform certain operations. Such operations include requesting the user to answer questions on a form, or to choose options from a table.

The user then selects (115) the desired options and settings. In a preferred embodiment of the invention, the settings provided by the HTML page include special HTML codes that automatically adjust (120) the Internet-compatible telephone accordingly. In an alternative, equally preferred embodiment, the data are downloaded (125) from the HTML page to programmable memory, such as flash memory (non-volatile memory), in the Internet-compatible telephone. The data stored in the non-volatile memory are then used to configure (130) the Internet-compatible telephone. This foregoing operation may be implemented using a unique put/get mechanism (discussed below).

The preferred embodiment of the invention may also implement a security scheme to prevent the intentional corruption of the information contained within the Internet appliance, for example, by a virus, or as a result of an unauthorized or unintentional reconfiguration request.

In one embodiment of the invention, the upgrade Web page includes information that alerts the user when the HTML page contains new information regarding changes to options and settings of the Internet-compatible telephone. The user may select particular options or settings for which the user wishes to receive notification, or the user may be notified of all changes to the options or settings. The Internet-compatible telephone may then either be automatically reconfigured with these changes, or reconfigured at the user's discretion.

Any HTML page may be created with the special tags that are required to reconfigure and/or query Internet-compatible telephone functions. Thus, equipment or service companies, such as a telephone company, can provide such HTML pages on their Web sites. A user then selects new features, such as Call Forwarding, or upgrades existing services directly from the telephone company.

In a preferred embodiment of the invention, a selectable area is provided on a graphical user interface of the Internet appliance, such as a slide-up window. The user selects the area, the Web site maintaining the HTML page for the desired service is automatically accessed, and the data are downloaded from the server to the Internet appliance to effect modification of the Internet appliance.

The HTML page can also include hyperlinks to other sites of interest to the user. In one embodiment of the invention, each linked HTML page provides the user with additional information and options. When the user decides to make a particular change, another hyperlink may be selected to implement the change. Such hyperlinks can be to more than one server site. For example, a user who desires to change the Internet-compatible telephone browser application to Japanese settings could select a hyperlink to a server in Japan.

Uniquely, the invention provides a novel mechanism that supports both HTML push and pull data transmission between the Internet and the Internet appliance, and that provides automated functions therefore. Such functions can include, for example an upgrade or reconfiguration of the Internet appliance, checking e-mail, putting information, and getting information. With regard to configuration, the mechanism provides for the setting and resetting of various user preferences or system-required preferences (for example an Intranet that has been customized for a particular company's requirements). Further, functionality can include monitoring functions such as checking variables and getting the state of an upgrade. For example, such monitoring functions may be used to determine if the Internet appliance does not include the most recent version of a particular operating element ("firmware").

In connection with the put/get function, a server shows a configuration Web page. The Internet appliance is operable to put information, such as field information, into the server's local non-volatile memory. Alternatively, the server can transparently put this information into the Internet appliance's non-volatile memory. Uniquely, this information is derived from the contents of the HTML page.

With regard to the get function, the server may show an HTML page in which there is a get function. The Internet appliance may place values into this HTML page, i.e. substitute them into the HTML page dynamically before redisplaying the page locally. Thus, the Internet appliance gets information from its nonvolatile memory and substitutes it into a displayed HTML page. The Internet appliance can send the HTML page with the information that was received (gotten) from the non-volatile memory and return the HTML page with the information from non-volatile memory to the server.

Figure 3:
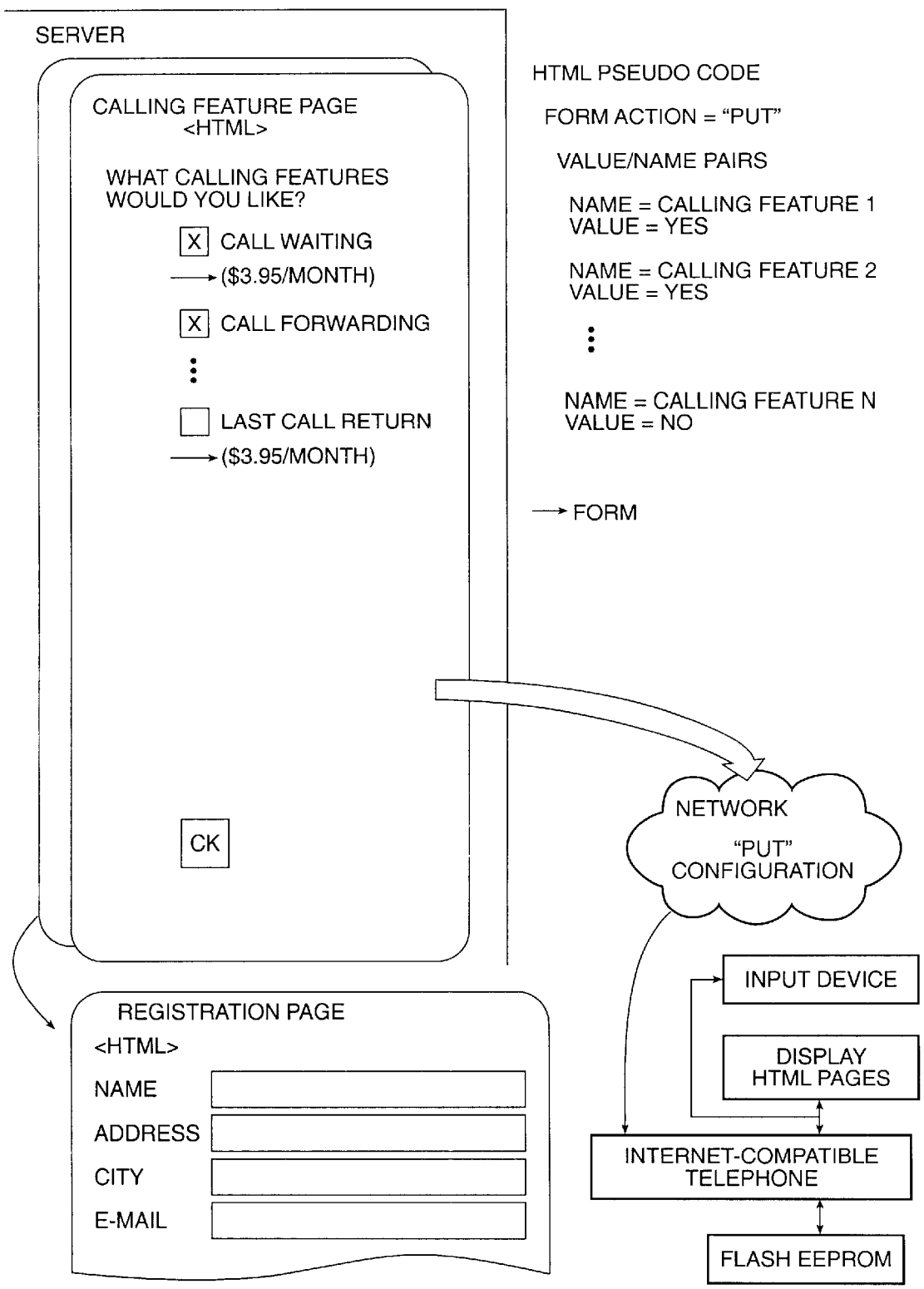
FIG. 3 is a schematic representation of an HTML page showing a put operation in accordance with the present invention.

In summary, the put/get functions allow the placing of information from the Internet appliance into a form and/or the putting of information from any other form into the Internet appliance. For example, a telephone company may provide a calling feature page (see FIG. 3). The page may query the user as to what calling features are desired. The user would check those features. In FIG. 3, the user has checked call waiting and call forwarding. The user would also complete a registration page. When the form is completed, the HTML information that is sent from the telephone company server includes configuration information for the Internet appliance that is put into the Internet appliance. In this way the Internet appliance may be configured for call waiting and call forwarding functions. In the preferred embodiment of the invention, this information would be placed into non-volatile local memory such as a flash EEPROM (electrically erasable programmable read only memory) or other similar storage device in the Internet appliance.

Figure 4:
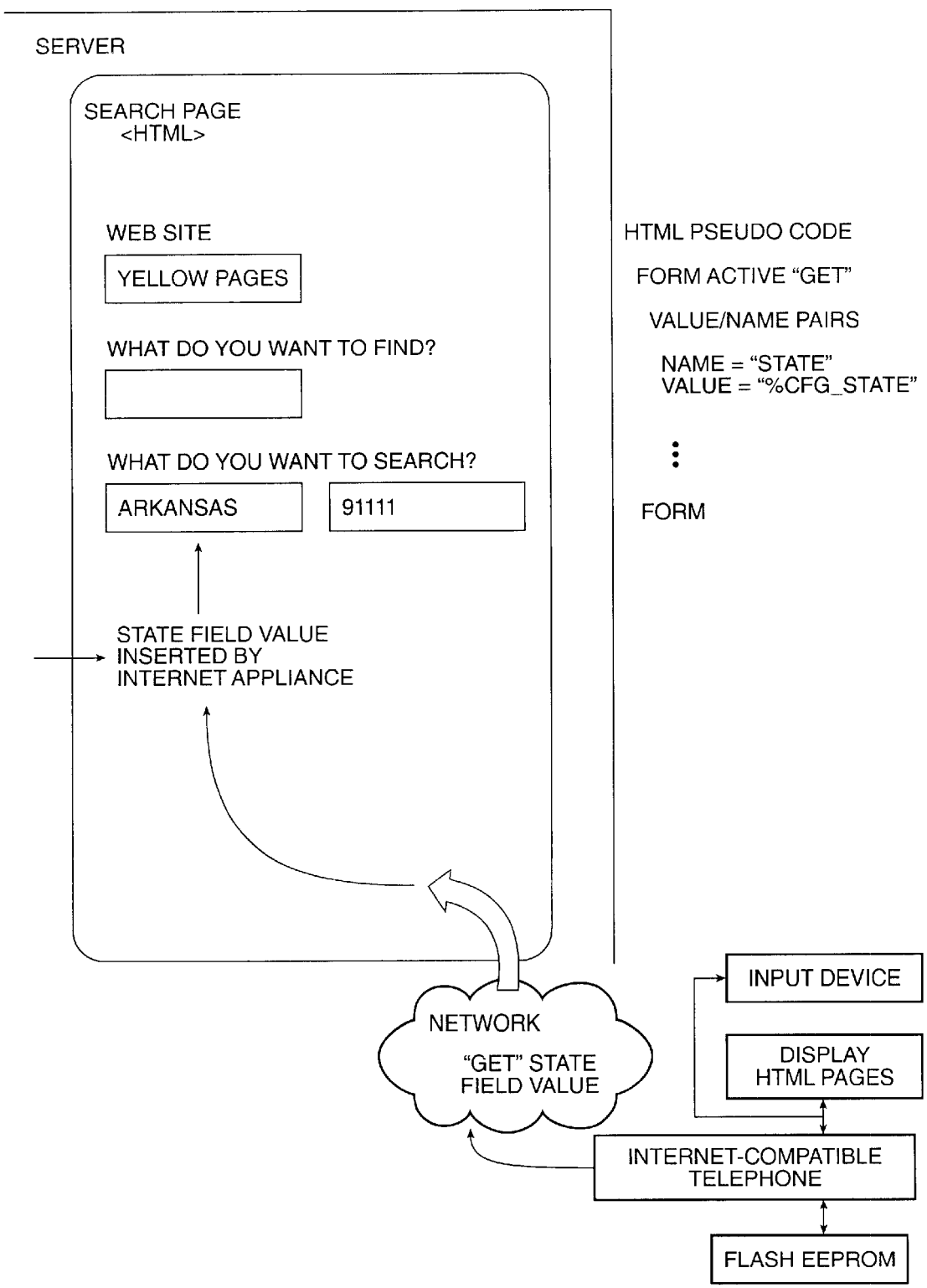
FIG. 4 is a schematic representation of an HTML page showing a get operation in accordance with the present invention.

FIG. 4 shows an example of a get function. In this example, a search page is shown that is presented at the Internet appliance pursuant to a Yellow Pages search. With regard to certain fields within the form, the Internet appliance may have been configured to supply information to complete the form. For example, for each search, the form automatically confines the search to the State of Arkansas because the Internet appliance is located in Arkansas and it is assumed that a Yellow Page search is conducted locally. In such case, each time the search page for the Yellow Pages is retrieved, the HTML mechanism gets the state information from memory within the Internet appliance. In this way a default is established.

Additionally, the put/get functions may be used with regard to variables, for example with regard to configuration of the Internet appliance and the operating status for various Internet appliance features (for example, whether the Internet appliance is operating properly). Finally, the put/get functions may be used within an Intranet (for example to configure the Internet appliance to a given company's particular requirements).

The following provides two examples of the put/get mechanism in accordance with the invention.

EXAMPLE 1

An HTML file for the Get/Put mechanism of internal client parameters:
```
<HTML>
<pre>
<FORM action="iph://phone/cfg_put">
```
user name: <INPUT type=text name="cfg_isp_user_name">
```
<INPUT type=hidden name="cfg_isp_phone" value="1-408-1234">
<INPUT type=submit value=put>
</FORM>

<FORM action="http://www.infogear.com/mydirectory/myscript.cgi">
```
user name: <INPUT type=text name="my_username" value="%cfg_isp_user_name">
```
<INPUT type=hidden name="my_dialin" value="%cfg_isp_phone">
<INPUT type=submit value=get>
</FORM>

</pre>
</HTML>
```
Explanation

This file includes two forms, the first for 'put' (write new values for configuration parameters, and the second for 'get' (read information from configuration parameters). In the first form there are two variables that are written as soon as the user presses the submit button. The first variable is the 'user name' setting on the Internet appliance. In the example, the user is required to input his name. The second variable is the telephone number of the ISP. In the example above, the number is fixed, and is hidden from the user.

In the second form, there are two variables that are read as soon as the user presses the submit button, and are sent to the user's script called 'myscript'. The first variable is the 'user name' setting on the Internet appliance. In the example, the user can change the name, using the internal name as default. The second variable is the phone number of the ISP. In the example above, the telephone number is read automatically without the user's knowledge.

EXAMPLE 2

An HTML file for Internet appliance internal function call from within an HTML file:
```
<HTML>
<FORM action="iph://phone/dial">
```
Phone to dial: <INPUT type=text name="p" value="1-408-1234">
```
<INPUT type=submit value=dial>
</FORM>

<a href="iph://phone/dial?p=1-408-1234">Dial link </a>

</HTML>
```
Explanation

The example uses the telephone internal 'dial' function. The first section is a form that allows the user to type a telephone number to dial in an edit box. The second section is a link that dials a fixed telephone number.

The invention is best appreciated when it's considered that HTML is currently the content of a particular page and the format. In the invention, HTML is a part of a program in that the HTML tags themselves perform programming functions, such as configuration or completion of a form. In previous uses of HTML, these functions were preformed by a user as in response to an instruction contained and read from an HTML page by the user. In this regard, the invention is seen as being broadly applicable to any type of programming environment, for example where the HTML code may be used to provide a user interface for an embedded device. In this case the HTML is the user interface and the uniform resource locators are functions of a program within the user interface. For example, an HTML front end may be provided as a user interface to a C code program. In that case, there is no need to compile the user interface and the user interface is therefore portable and readily accessible. This is particularly true because HTML is a relatively simple programming language. In this regard, a user interface may be provided with a more complex program, for example a word processing program or spreadsheet program written in C, in which case the user interface is readily customized by the user without the need to know the underlying programming language, i.e. C.

A URL (Uniform Resource Locator) in general is described in *Uniform Resonance Locators (URL)*, RFC 1738 (www.23.org/addressing/RFC1738.txt). In accordance with the invention, a URL may be thought of as describing a protocol (for example, http) in which there is a host (the put or get location) and a particular location within the host (for example, flash memory). The URL is uniquely used to call internal functions of the device (either the client or the server) to get information or to put information as required. In connection with the Internet appliance, a particular URL may be used (for example i_ph:// or iPh://gw). In this example the host is the Internet appliance and the location within the Internet appliance is the function called (for example the setting of call waiting).

Additional applications of the present invention include the calling of internal functions of the Internet appliance, when the Internet appliance is operating as a Web client, via HTML pages. For example, a URL may be used to define resources or functions within the Web client, e.g. checking e-mail.

Although the invention is described herein with reference to the preferred embodiment, one skilled in the art will readily appreciate that other applications may be substituted for those set forth herein without departing from the spirit and scope of the present invention. For example, a profile of the Internet-compatible telephone user may be stored in the Internet-compatible telephone. The HTML page includes special functionality that accesses this profile to allow the system to provide customized services, such as the sending of certain material to the user. Accordingly, the invention should only be limited by the Claims included below.

What is claimed is:

1. A method for configuring a configurable network appliance having local non-volatile memory for storing configuration information, said method comprising:
   establishing a telecommunications session between the network appliance and a network server;
   writing information regarding said configurable network appliance within a first set of one or more special tags within a web page using said network appliance;
   uploading said web page to the network server;
   accessing said web page stored on the network server with the network appliance, the web page having stored information for configuration of a parameter of the network appliance contained within a second set of one or more special tags;
   receiving said stored information with the network appliance;
   parsing the at least a portion of the stored information to determine an action and identify configuration information to accompany the action;
   configuring the network appliance by writing configuration information derived from the stored information into a local non-volatile configuration memory of the network appliance in accordance with said action.

2. A method in accordance with claim 1, further comprising:
   creating a profile containing a plurality of items of configuration information for the network appliance;
   storing said profile in local non-volatile configuration memory of the network appliance; and
   using said profile during said configuring.

3. A method for configuring a configurable network appliance having local non-volatile memory for storing configuration information, said method comprising:
   establishing a telecommunications session between the network appliance and a network server;
   writing information regarding said configurable network appliance within a first set of one or more special tags within a web page using said network appliance;
   uploading said web page to the network server;
   accessing a web page stored on the network server with the network appliance to retrieve stored information for configuration of a parameter of the network appliance contained within a second set of one or more special tags;
   receiving said stored information with the network appliance
   parsing the at least a portion of the stored information to determine an action and identify configuration information to accompany the action; and
   configuring the network appliance by writing configuration information derived from the stored information into a local non-volatile configuration memory of the network appliance in accordance with said action.

4. A method in accordance with claim 3, further comprising:
   creating a profile containing a plurality of items of configuration information for the network appliance;
   storing said profile in local non-volatile configuration memory of the network appliance; and
   using said profile during said configuring.

5. A method for uploading configuration information from a configurable network appliance to a network server, the appliance having local non-volatile memory for storing configuration information, said method comprising:
   establishing a telecommunications session between the network appliance and the network server;
   writing information regarding said configurable network appliance within a first set of one or more special tags within a web page using said network appliance;
   uploading said web page to the network server;
   accessing a web page stored on the network server with the network appliance contained within a second set of one or more special tags;
   downloading at least a portion of the web page to the network appliance;
   reading a configuration value for a parameter of the network appliance from a local non-volatile memory associated with the network appliance; and
   writing the configuration value to a storage device associated with the web page.

6. A method in accordance with claim 5, further comprising:

creating a profile containing a plurality of items of configuration information for the network appliance;

storing said profile in local non-volatile configuration memory of the network appliance; and using said profile during said configuring.

7. A method for configuring a configurable network appliance having local non-volatile memory for storing configuration information, said method comprising:

creating a profile containing a plurality of items of configuration information for the network appliance;

storing the profile in the local non-volatile configuration memory of the network appliance;

establishing a telecommunications session between the network appliance and a network server;

writing information regarding said configurable network appliance within a first set of one or more special tags within a web page using said network appliance;

uploading said web page to the network server;

accessing a web page stored on the network server with the network appliance contained within a second set of one or more special tabs to retrieve stored information for configuration of a parameter of the network appliance;

receiving at least a portion of the stored information with the network appliance;

parsing the at least a portion of the stored information to determine an action and identify configuration information to accompany the action;

reading the profile; and configuring the network appliance in accordance with the profile by writing the configuration information derived from the stored information into the local non-volatile configuration memory for the network appliance in accordance with said action.

* * * * *